(12) United States Patent
Liu

(10) Patent No.: US 11,447,159 B2
(45) Date of Patent: Sep. 20, 2022

(54) INTERIOR DECORATION STRUCTURE AND RAILWAY VEHICLE WITH INTERIOR DECORATION STRUCTURE

(71) Applicant: CRRC QINGDAO SIFANG CO., LTD., Qingdao (CN)

(72) Inventor: Bin Liu, Qingdao (CN)

(73) Assignee: CRRC QINGDAO SIFANG CO., LTD., Qingdao (CN)

( * ) Notice: Subject to any disclaimer, the term of this patent is extended or adjusted under 35 U.S.C. 154(b) by 986 days.

(21) Appl. No.: 16/185,254

(22) Filed: Nov. 9, 2018

(65) Prior Publication Data

US 2019/0077423 A1 Mar. 14, 2019

(30) Foreign Application Priority Data

Jun. 22, 2018 (CN) .......................... 201820974723.5

(51) Int. Cl.
| | |
|---|---|
| *B61D 17/08* | (2006.01) |
| *B61D 27/00* | (2006.01) |
| *B60H 1/24* | (2006.01) |
| *B61D 1/00* | (2006.01) |
| *B61D 25/00* | (2006.01) |

(52) U.S. Cl.
CPC .............. *B61D 17/08* (2013.01); *B60H 1/243* (2013.01); *B61D 1/00* (2013.01); *B61D 25/00* (2013.01); *B61D 27/0018* (2013.01); *B61D 27/0036* (2013.01)

(58) Field of Classification Search
CPC .......................... B61D 27/00; B61D 27/0036; B61D 27/0045; B61D 1/00; B61D 17/18; B61D 17/048; B61D 17/08; B61D 17/06; B61D 27/0018; B61D 49/00; B61D 25/00; B60H 1/243; B60H 1/246; B60H 1/26; B60H 1/265; B60H 1/267
See application file for complete search history.

(56) References Cited

U.S. PATENT DOCUMENTS

| | | | | |
|---|---|---|---|---|
| 2,405,839 | A * | 8/1946 | Ledwinka | B61D 27/0036 237/45 |
| 2,461,424 | A * | 2/1949 | Jones | B61D 27/0036 237/40 |

(Continued)

FOREIGN PATENT DOCUMENTS

| | | | | |
|---|---|---|---|---|
| CN | 106347394 | A * | 1/2017 | ......... B61D 27/0018 |
| FR | 2462319 | A * | 3/1981 | ......... B61D 27/0036 |

*Primary Examiner* — Zachary L Kuhfuss
*Assistant Examiner* — Cheng Lin
(74) *Attorney, Agent, or Firm* — Cantor Colburn LLP

(57) ABSTRACT

An embodiment of the present disclosure provides an interior decoration structure and a railway vehicle with the interior decoration structure. The interior decoration structure is located inside a vehicle body. The interior decoration structure includes: a plurality of interior decoration components, the plurality of interior decoration components being spliced inside the vehicle body in sequence, wherein at least one pair of two adjacent interior decoration components are connected by an inserted-connected structure. The interior decoration structure in the present disclosure solves the problem in the related art that interior decoration parts are prone to unstable connection due to a mounting mode of an interior decoration structure.

15 Claims, 3 Drawing Sheets

(56) References Cited

U.S. PATENT DOCUMENTS

| | | | |
|---|---|---|---|
| 2,595,212 A * | 4/1952 | Ledwinka | B61D 17/043 |
| | | | 52/48 |
| 2,978,995 A * | 4/1961 | Dean | B61D 17/18 |
| | | | 52/204.55 |
| 3,631,817 A * | 1/1972 | O'Neill | B61D 17/08 |
| | | | 105/401 |

* cited by examiner

INTERIOR DECORATION STRUCTURE AND RAILWAY VEHICLE WITH INTERIOR DECORATION STRUCTURE

TECHNICAL FIELD

The present disclosure relates to a field of railway vehicles, and in particular to an interior decoration structure and a railway vehicle with the interior decoration structure.

BACKGROUND

Rail traffic means a class of vehicle or transportation systems for operating vehicles that need to run on specific rails. The rail traffic is a railway system composed of a traditional train and a standard railway. With the diversified development of train and railway technologies, the rail traffic presents increasing types, not only covers long-distance land transportation, but also is widely applied to medium-short distance urban public traffic.

In a railway vehicle, the railway vehicle has an interior decoration structure, which mainly refers to vehicle supplies located inside the vehicle, involving all components inside the vehicle. Since these parts of the vehicle have a certain decoration, they are usually referred to as vehicle interior decorations in the industry.

However, the interior decoration structure of the railway vehicle has the problems of non-attractive original pressing strips and covering strips and loss of the covering strips, thus affecting mounting of the interior decoration structure, and making the connection between parts of the interior decoration structure unstable.

SUMMARY

Some embodiments of the present disclosure provide an interior decoration structure and a railway vehicle with the interior decoration structure, solving the problem in the related art that interior decoration parts are prone to unstable connection due to a mounting mode of an interior decoration structure.

To this end, an embodiment of the present disclosure provides an interior decoration structure, the interior decoration structure is located inside a vehicle body. The interior decoration structure includes: multiple interior decoration components, the multiple interior decoration components being spliced inside the vehicle body in sequence, wherein at least one pair of two adjacent interior decoration components are connected by an inserted-connected structure.

Another embodiment of the present disclosure provides a railway vehicle. The railway vehicle includes a vehicle body and an interior decoration structure provided in the vehicle body, the interior decoration structure being the above interior decoration structure.

The interior decoration structure in an embodiment of the present disclosure includes: a plurality of interior decoration components, the plurality of interior decoration components being spliced inside the vehicle body in sequence, wherein at least one pair of two adjacent interior decoration components are connected by an inserted-connected structure. Thus, the interior decoration components located inside the vehicle body can be conveniently connected together, so that the situation of connection between the interior decoration components by pressing strips and covering strips is avoided, and the stability of connection between the interior decoration components is improved, thereby the problem in the related art that interior decoration parts are prone to unstable connection due to a mounting mode of an interior decoration structure is solved.

BRIEF DESCRIPTION OF THE DRAWINGS

The accompanying drawings, which constitute a part of the present application, are used to provide a further understanding of the present disclosure, and the exemplary embodiments of the present disclosure and the description thereof are used to explain the present disclosure, but do not constitute improper limitations to the present disclosure. In the drawings.

The drawings include the following reference signs:

10: air supply opening component; 11: second insertion groove; 12: air supply opening main body; 13: second insertion plate; 20: under-window wallboard; 21: second insertion portion; 22: first insertion portion; 30: window wallboard; 40: mounting bracket; 50: heating cover plate; 51: first insertion groove; 52: cover plate body; 53: first insertion plate; 60: vehicle body; 70: heating cover plate inspection door; 80: supporting bracket.

DETAILED DESCRIPTION OF THE EMBODIMENTS

It is to be noted that in the case of no conflict, the features in the embodiments and the embodiments in the present application may be combined with each other. The present disclosure is described below with reference to the drawings and in conjunction with the embodiments in detail.

Figure 1:
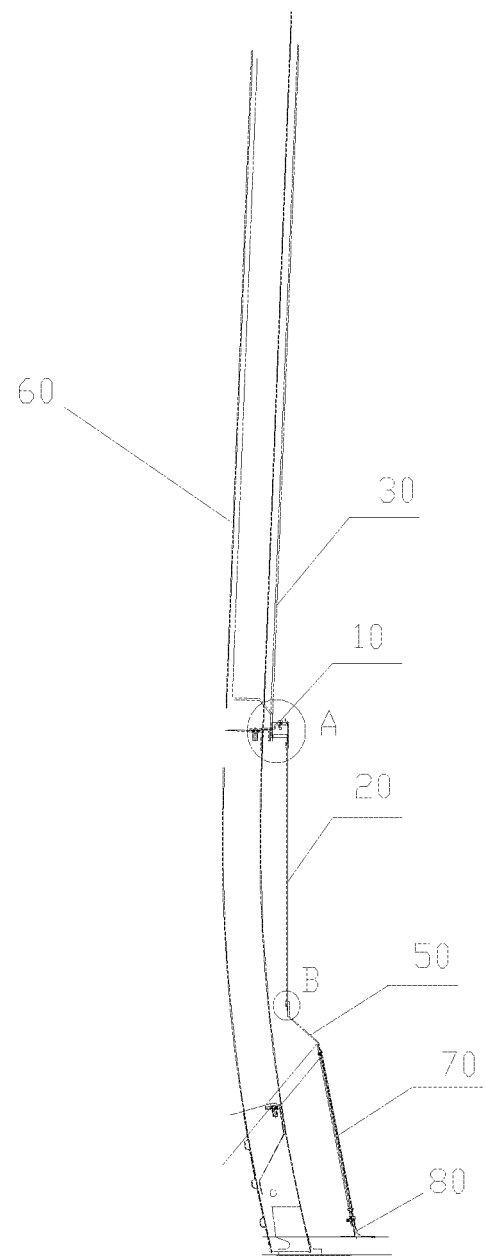
FIG. 1 illustrates a structural schematic diagram of an interior decoration structure according to an embodiment of the present disclosure.
Figure 2:
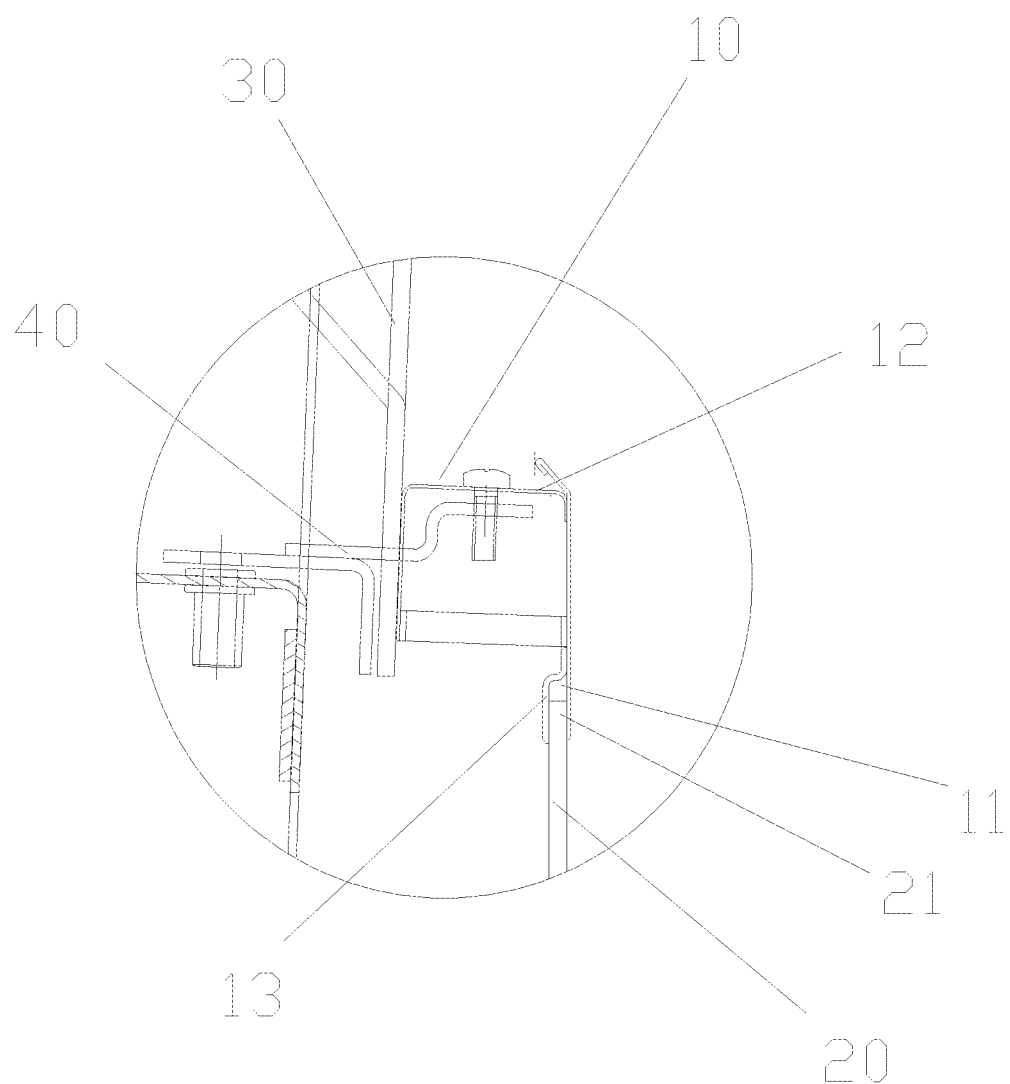
FIG. 2 illustrates an enlarged view of a part A of the interior decoration structure in FIG. 1.
Figure 3:
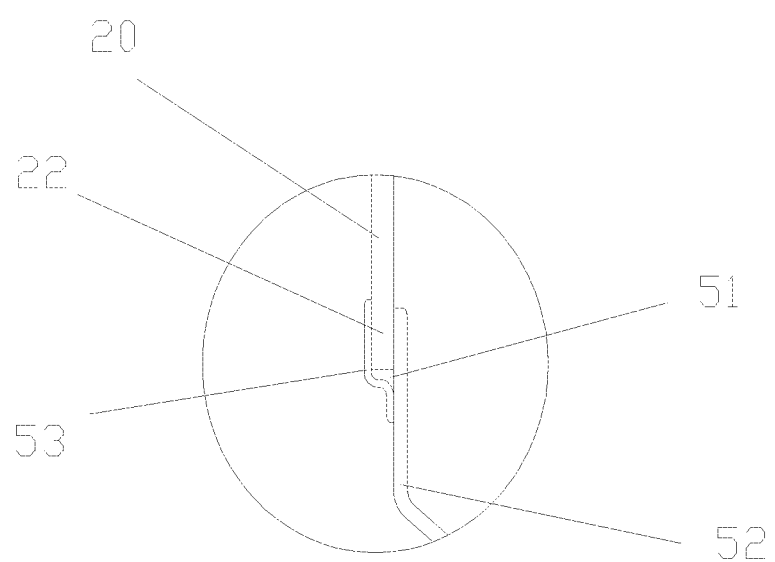
FIG. 3 illustrates an enlarged view of a part B of the interior decoration structure in FIG. 1.

The interior decoration structure in the present disclosure is located inside a vehicle body 60. Referring to FIG. 1 to FIG. 3, the interior decoration structure includes: a plurality of interior decoration components, the plurality of interior decoration components being spliced inside the vehicle body 60 in sequence, wherein at least one pair of two adjacent interior decoration components are connected by an inserted-connected structure.

The interior decoration structure in an embodiment of the present disclosure includes: a plurality of interior decoration components, the plurality of interior decoration components being spliced inside the vehicle body 60 in sequence, wherein at least one pair of two adjacent interior decoration components are connected by an inserted-connected structure. Thus, the interior decoration components located inside the vehicle body 60 can be conveniently connected together, so that the situation of connection between the interior decoration components by pressing strips and covering strips is avoided, and the stability of connection between the interior decoration components is improved, thereby the problem in the related art that interior decoration parts are prone to unstable connection due to a mounting mode of an interior decoration structure is solved.

In order to realize insertion between the interior decoration components, the inserted-connected structure includes an insertion groove and an insertion portion inserted into the insertion groove, wherein the insertion groove and the insertion portion are provided on the two adjacent interior decoration components in a one-to-one correspondence manner.

In an exemplary embodiment, the inserted-connected structure includes an insertion plate, the insertion plate being connected to an interior decoration main body of the corresponding interior decoration component in the two adjacent interior decoration components, and the insertion groove being surrounded by the insertion plate and the interior decoration main body. By providing the insertion plate, the insertion groove may be conveniently formed.

In an exemplary embodiment, as shown in FIG. 1 to FIG. 3, the insertion plate includes a first plate body, a second plate body, and a third plate body connecting the first plate body and the second plate body, wherein the first plate body is attached and connected with the interior decoration main body of the corresponding interior decoration component, and the second plate body and the interior decoration main body of the corresponding interior decoration component are provided at an interval to form the insertion groove.

In an exemplary embodiment, as shown in FIG. 1 and FIG. 2, the plurality of interior decoration components include: an air supply opening component 10; and an under-window wallboard 20, the under-window wallboard 20 being located on a lower side of the air supply opening component 10, the air supply opening component 10 being connected to the under-window wallboard 20 by the inserted-connected structure.

In an exemplary embodiment, as shown in FIG. 2, the air supply opening component 10 is provided with a second insertion groove 11, the under-window wallboard 20 is provided with a second insertion portion 21, the second insertion portion 21 is inserted into the second insertion groove 11, and the second insertion groove 11 and the second insertion portion 21 form the inserted-connected structure between the air supply opening component 10 and the under-window wallboard 20. Thus, the stable connection between the air supply opening component 10 and the under-window wallboard 20 can be ensured.

In an exemplary embodiment, as shown in FIG. 2, the air supply opening component 10 includes an air supply opening main body 12 and a second insertion plate 13 provided on the air supply opening main body 12, the second insertion groove 11 being surrounded between the second insertion plate 13 and the air supply opening main body 12; and a top of the under-window wallboard 20 forms the second insertion portion 21. By designing the second insertion plate 13, the second insertion groove 11 may be conveniently formed.

In an exemplary embodiment, as shown in FIG. 1, the plurality of interior decoration components include: a window wallboard 30, the window wallboard 30 being provided above the under-window wallboard 20, the window wallboard 30 being located on a side, close to the vehicle body 60, of the under-window wallboard 20, and the air supply opening component 10 being located between the window wallboard 30 and the under-window wallboard 20. In an exemplary embodiment, the air supply opening component 10 abuts against the window wallboard 30 and the air supply opening component 10 abuts against the under-window wallboard 20.

In order to realize the connection between the vehicle body 60 and the air supply opening component 10, as shown in FIG. 2, in an exemplary embodiment, the interior decoration structure further includes: a mounting bracket 40, the mounting bracket 40 being provided on the vehicle body 60, and the mounting bracket 40 being connected with the air supply opening component 10, so that the air supply opening component 10 is mounted on the vehicle body 60 by the mounting bracket 40.

In an exemplary embodiment, the mounting bracket 40 includes a first bracket and a second bracket, the first bracket being fixed to the vehicle body by a bolt, the second bracket being connected with the first bracket, and the air supply opening component 10 being mounted on the second bracket. Preferably, the first bracket is an L-shaped structure formed by a first plate segment and a second plate segment, the first plate segment of the first bracket is connected with the vehicle body by a bolt, and the second plate segment of the first bracket extends downward and abuts against the window wallboard 30. The second bracket includes a third plate segment, a fourth plate segment and a fifth plate segment connecting the third plate segment and the fourth plate segment, the third plate segment, the fifth plate segment and the fourth plate segment are spliced in sequence to form a Z-shaped structure, the third plate segment is connected with the first plate segment, and the fifth plate segment is located above the third plate segment, and the fifth plate segment is connected with the air supply opening component 10 by a bolt.

In an exemplary embodiment, as shown in FIG. 1 and FIG. 3, the interior decoration structure further includes: a heating cover plate 50, the heating cover plate 50 being provided at a bottom of the under-window wallboard 20, and the heating cover plate 50 being connected with the under-window wallboard 20 by the inserted-connected structure. Thus, the heating cover plate 50 and the under-window wallboard 20 can be conveniently connected.

In an exemplary embodiment, as shown in FIG. 3, the heating cover plate 50 is provided with a first insertion groove 51, the under-window wallboard 20 is provided with a second insertion portion 22, the second insertion portion 22 is inserted into the first insertion groove 51, and the first insertion groove 51 and the second insertion portion 22 form the inserted-connected structure between the heating cover plate 50 and the under-window wallboard 20. Thus, the heating cover plate 50 and the under-window wallboard 20 can be conveniently inserted.

In an exemplary embodiment, the heating cover plate 50 includes a cover plate body 52 and a first insertion plate 53 provided on the cover plate body 52, the first insertion groove 51 being surrounded between the first insertion plate 53 and the cover plate body 52; and the bottom of the under-window wallboard 20 forms the second insertion portion 22.

In an exemplary embodiment, the interior decoration structure further includes: a heating cover plate inspection door 70, an upper end of the heating cover plate inspection door 70 being connected with the heating cover plate 50, and a lower end of the heating cover plate inspection door 70 being connected with the vehicle body 60 by a supporting bracket 80. By arranging the supporting bracket 80, the heating cover plate inspection door 70 and a bottom of the vehicle body 60 can be conveniently connected. In an exemplary embodiment, the supporting bracket 80 is an arc-shaped plate.

An embodiment of the present disclosure also provides a railway vehicle. The railway vehicle includes a vehicle body 60 and an interior decoration structure provided in the vehicle body 60, the interior decoration structure being the above interior decoration structure.

At present, the problems of appearance and prevention of burglary are solved by mounting forms of removing pressing strip and covering strip, repair and dismounting habits are not changed, and a material combination mode is not changed.

The main improvement points of some embodiments of the present disclosure are: a mode of pre-assembling components in an insertion form, a mode of processing the last stage of mounting point by the interior decoration of an inspection door and a non-obvious position at an air supply opening, and a mode of combining different materials in an insertion form.

In an exemplary embodiment of the present disclosure, a traditional mounting structure method is changed, a mounting mode of inspection area which may be opened and a position without exposure may be adopted in an insertion and mounting order, traditional pressing strip and covering strip mounting structures are replaced, the appearance is attractive, different types of materials can be combined, and the purposes of the same repair demand and habit are achieved.

From the above description, it can be seen that the above embodiment of the present disclosure achieves the following technical effects.

The interior decoration structure in the present disclosure includes: a plurality of interior decoration components, the plurality of interior decoration components being spliced inside the vehicle body 60 in sequence, wherein at least one pair of two adjacent interior decoration components are connected by an inserted-connected structure. Thus, the interior decoration components located inside the vehicle body 60 can be conveniently connected together, so that the situation of connection between the interior decoration components by pressing strips and covering strips is avoided, and the stability of connection between the interior decoration components is improved, thereby the problem in the related art that interior decoration parts are prone to unstable connection due to a mounting mode of an interior decoration structure is solved.

The above is only the preferred embodiments of the present disclosure, not intended to limit the present disclosure. As will occur to those skilled in the art, the present disclosure is susceptible to various modifications and changes. Any modifications, equivalent replacements, improvements and the like made within the spirit and principle of the present disclosure shall fall within the scope of protection of the present disclosure.

What is claimed is:

1. An interior decoration structure, located inside a vehicle body, the interior decoration structure comprising:
   a plurality of interior decoration components, the plurality of interior decoration components being spliced inside the vehicle body in sequence,
   wherein at least one pair of two adjacent interior decoration components are connected by an inserted-connected structure, the plurality of interior decoration components comprises an air supply opening component and an under-window wallboard, the under-window wallboard being located on a lower side of the air supply opening component, the air supply opening component being connected with the under-window wallboard by the inserted-connected structure;
   a heating cover plate, the heating cover plate being provided at a bottom of the under-window wallboard, and the heating cover plate being connected with the under-window wallboard by the inserted-connected structure, the heating cover plate is provided with a first insertion groove, the under-window wallboard is provided with a first insertion portion, the first insertion portion is inserted into the first insertion groove, and the first insertion groove and the first insertion portion form the inserted-connected structure between the heating cover plate and the under-window wallboard, the heating cover plate comprises a cover plate body and the first insertion plate provided on the cover plate body, the first insertion groove being surrounded between the first insertion plate and the cover plate body; and the bottom of the under-window wallboard forms a first insertion portion.

2. The interior decoration structure as claimed in claim 1, wherein the inserted-connected structure comprises an insertion groove and an insertion portion inserted into the insertion groove, the insertion groove and the insertion portion being provided on the two adjacent interior decoration components in a one-to-one correspondence manner.

3. A railway vehicle, comprising a vehicle body and an interior decoration structure provided in the vehicle body, wherein the interior decoration structure is the interior decoration structure as claimed in claim 2.

4. The interior decoration structure as claimed in claim 2, wherein the inserted-connected structure comprises an insertion plate, the insertion plate being connected with an interior decoration main body of a corresponding interior decoration component in the two adjacent interior decoration components, and the insertion groove being surrounded by the insertion plate and the interior decoration main body.

5. A railway vehicle, comprising a vehicle body and an interior decoration structure provided in the vehicle body, wherein the interior decoration structure is the interior decoration structure as claimed in claim 4.

6. The interior decoration structure as claimed in claim 4, wherein the insertion plate comprises a first plate body, a second plate body, and a third plate body connecting the first plate body and the second plate body, wherein the first plate body is attached and connected with the interior decoration main body of the corresponding interior decoration component, and the second plate body and the interior decoration main body of the corresponding interior decoration component are provided at an interval to form the insertion groove.

7. A railway vehicle, comprising a vehicle body and an interior decoration structure provided in the vehicle body, wherein the interior decoration structure is the interior decoration structure as claimed in claim 6.

8. The interior decoration structure as claimed in claim 1, wherein the air supply opening component is provided with a second insertion groove, the under-window wallboard is provided with a first insertion portion, the second insertion portion is inserted into the second insertion groove, and the second insertion groove and the second insertion portion form the inserted-connected structure between the air supply opening component and the under-window wallboard.

9. The interior decoration structure as claimed in claim 8, wherein the air supply opening component comprises an air supply opening main body and a second insertion plate provided on the air supply opening main body, the second insertion groove being surrounded between the second insertion plate and the air supply opening main body; and a top of the under-window wallboard forms the second insertion portion.

10. A railway vehicle, comprising a vehicle body and an interior decoration structure provided in the vehicle body, wherein the interior decoration structure is the interior decoration structure as claimed in claim 9.

11. A railway vehicle, comprising a vehicle body and an interior decoration structure provided in the vehicle body, wherein the interior decoration structure is the interior decoration structure as claimed in claim 8.

12. The interior decoration structure as claimed in claim 1, wherein the plurality of interior decoration components comprises:
  a window wallboard, the window wallboard being provided above the under-window wallboard, the window wallboard being located on a side, close to the vehicle body, of the under-window wallboard, and the air supply opening component being located between the window wallboard and the under-window wallboard.

13. The interior decoration structure as claimed in claim 1, further comprising:
  a mounting bracket, the mounting bracket being provided on the vehicle body, and the mounting bracket being connected with the air supply opening component, so that the air supply opening component is mounted on the vehicle body (60) by the mounting bracket.

14. The interior decoration structure as claimed in claim 1, further comprising:
  a heating cover plate inspection door, an upper end of the heating cover plate inspection door being connected with the heating cover plate, and a lower end of the heating cover plate inspection door being connected with the vehicle body by a supporting bracket.

15. A railway vehicle, comprising a vehicle body and an interior decoration structure provided in the vehicle body, wherein the interior decoration structure is the interior decoration structure as claimed in claim 1.

* * * * *